United States Patent [19]

Alafandi et al.

[11] 4,224,188

[45] Sep. 23, 1980

[54] ALUMINUM FAUJASITES, CATALYST CONTAINING SAME AND PROCESS OF PRODUCING SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 886,077

[22] Filed: Mar. 13, 1978

[51] Int. Cl.³ .................. B01J 29/08; C01B 33/28
[52] U.S. Cl. .................. 252/455 Z; 423/328
[58] Field of Search ............... 423/328–330; 252/455 Z

[56] References Cited

U.S. PATENT DOCUMENTS

| | | | |
|---|---|---|---|
| 3,140,249 | 7/1964 | Plank et al. | 252/455 Z |
| 3,140,252 | 7/1964 | Frilette et al. | 252/455 Z |
| 3,374,057 | 3/1968 | McDaniel et al. | 423/328 |
| 3,455,842 | 7/1969 | Cornelius et al. | 423/328 X |
| 3,607,043 | 9/1971 | McDaniel et al. | 252/455 Z |
| 3,835,030 | 9/1974 | Mattox et al. | 252/455 Z |

OTHER PUBLICATIONS

Wang et al., "Journal of Catalyst", 24, pp. 262–271, 1972.

*Primary Examiner*—Edward J. Meros
*Attorney, Agent, or Firm*—Philip Subkow; Bernard Kriegel

[57] ABSTRACT

This invention relates to zeolites of the faujasite type generally referred to as X or Y zeolites which contain both aluminum and $NH_4$ in exchange position and catalysts employing the same.

The zeolite of our invention is derived from the sodium form of the zeolite by first exchanging the sodium form with an aluminum ion to replace a substantial portion of the sodium and further reducing the sodium content of the zeolite by exchange with an ammonium ion.

14 Claims, No Drawings

ALUMINUM FAUJASITES, CATALYST CONTAINING SAME AND PROCESS OF PRODUCING SAME

BACKGROUND OF THE INVENTION

Catalyst formed from faujasite of the zeolites X, (see Milton, U.S. Pat. No. 2,882,244) or Y, (see Breck, U.S. Pat. No. 3,130,007), have been formulated by exchanging the major portion of the sodium in the zeolite as formed by H or $NH_4$ ions and also by polyvalent cations.

While the prior art relating to exchange includes exchange with a great variety of cations, the commercial catalysts employing faujasite zeolites have been largely those in which the Na is exchanged with $NH_4$, alkaline earth cations and rare earth cations.

Cracking catalysts which are formulated with a matrix and a Y zeolite which has been exchanged with rare earth cations, usually with an additional cation such as a monovalent cation H or $NH_4$ or with alkaline earth cations such as Mg, has also been used extensively.

The trivalent aluminum ion has also been suggested to replace Na in the faujasite zeolites. Cornelius et al, U.S. Pat. No. 3,455,542 states that they form an aluminum zeolite by direct exchange with aluminum salt solution or indirectly by first exchanging with ammonium salt solution and then exchanging with an aluminum salt solution. No information is given as to the chemical constitution of the so-called aluminum zeolite, nor is there any description of the procedure by which an aluminum zeolite which is formed by direct exchange may also be formed by the initial $NH_4$ exchange followed by an aluminum exchange.

McDaniel et al, U.S. Pat. No. 3,374,057 produces the zeolite in an exchange with a nitrogen base by incorporating a small amount of an aluminum salt. The process does not decrease the ratio of Si atoms to the aluminum atoms as would be expected if the aluminum was in exchange position without loss of Al from the crystal structure.

Grieg, U.S. Pat. No. 3,875,290 treats an ammonium exchanged crystalline aluminum silicate with a solution of aluminum salt or zirconium or chromium salt. The patent states that the metallic element precipitates as hydrate and on calcination appears as its oxide.

STATEMEMT OF THE INVENTION

We have found that we produce a catalyst of suitable activity characteristics formed from a zeolite of the faujasite type which has been exchanged with the aluminum cation. It is desirable that the exchange with an aluminum ion precede an exchange with ammonium ion. We have found that substitution of the ammonium cation by metallic polyvalent cations does not produce the improvement produced when the ammonium cation is used to add to the exchange of the Na produced by the exchange with the aluminum cation.

Activity of catalysts for cracking of petroleum fractions has been in this art determined by a test procedure in which the catalyst is first steamed. The M activity is determined after steaming for two hours at 1450° F. The S+ activity is determined after steaming for 2 hours at 1550° F. The test procedure is described in U.S. Pat. No. 4,058,484. The activity is reported as percent conversion.

The following examples illustrate our discovery.

EXAMPLE 1

This example illustrates the character of the catalyst produced employing a Y zeolite which has been exchanged first with an ammonium salt solution and the ammonium exchanged zeolite is exchanged with an aluminum salt solution.

The NaY of Example 1 analyzed as follows.

| | |
|---|---|
| $Na_2O$ | 13.5% |
| $Al_2O_3$ | 22.9% |
| $SiO_2$ | 63.8% |
| $SiO_2/Al_2O_3$ | ratio of 4.7 |

The sodium Y was exchanged at room temperature with ammonium nitrate at a pH of about 4.5, filtered and washed.

The ammonium exchanged zeolite had the following composition:

| | |
|---|---|
| $Na_2O$ | 5.74% |
| $Al_2O_3$ | 23.1% |
| $SiO_2$ | 68.5% |
| $NH_3$ | 4.85% |

This represents a replacement of 56% of the Na.

The ammonium zeolite which had been filtered and washed was then added to a solution of aluminum nitrate, which had been titrated with sodium hydroxide to bring the pH of the aluminum nitrate to a pH of about 3.2 to about 3.25. The ammonium zeolite was added slowly while adjusting the pH with nitric acid to remain in the range of 3.2 to 3.5 The mixture was then filtered and washed. The zeolite analyzed as follows:

| | |
|---|---|
| $Na_2O$ | 3.81 |
| $Al_2O_3$ | 30.7 |
| $SiO_2$ | 65 |
| $NO_3$ | 0.24 |

The treatment resulted in a further reduction of the Na content and an increase of the alumina content. An equivalent of aluminum replaces an equivalent of Na in an exchange process.

The zeolite produced by the $NH_4$ and aluminum exchange was incorporated into a matrix, and spray dried. The formulation and procedure is described in U.S. Pat. No. 4,058,484 to which reference may be made.

The slurry before spray drying had the following composition:

| | |
|---|---|
| zeolite | 19% |
| peptized pseudobeohmite | 18% |
| acid treated halloysite | 16% |
| ball clay | 47% |

The catalyst had the following activities:
M=36.5%
S+=32.8%

EXAMPLE 2

This example illustrates the effect produced by employing aluminum ion alone to produce the sodium reduction.

The NaY of Example 1 was exchanged with $Al(NO_3)$ solution whose pH had been adjusted as in Example 1.

The sodium Y was added to the Al(NO₃) adding also HNO₃ to keep the pH in the range of about 3.2 to about 3.5.

The slurry was filtered, washed and again re-exchanged as above.

The zeolite after the above exchange analyzed as follows:

| | |
|---|---|
| $Na_2O$ = | 3.9 |
| $Al_2O_3$ = | 29.7 |
| $SiO_2$ = | 65.7 |

The catalyst was tested for activity with the following results:
M=44%
S+=31%

EXAMPLE 3

A further reduction of the Na by a deeper exchange with aluminum by exchanging under pressures did not improve the M activity.

The pH of an aluminum nitrate solution was adjusted by sodium hydroxide to a pH of about 3.2. A slurry of the NaY of Example 1 was added slowly to the aluminum nitrate, maintaining the pH at about 3.5 by adding HNO₃. After the requisite amount of zeolite had been added, the mixture was autoclaved at a temperature of 340° F. for two hours. The mixture was cooled, filtered, and washed.

The zeolite analyzed as follows:

| | |
|---|---|
| $Na_2O$ | 1.44% |
| $Al_2O_3$ | 30.0% |
| $SiO_2$ | 64.4% |

The zeolite was formulated into a catalyst according to the procedure of Example 1 and tested for activity with the following results:
M=46%
S+=37.33%

It thus appears that the reduction of the sodium by aluminum exchange directly or indirectly by first exchanging with NH₄ and subsequently with aluminum, produces catalysts with inferior M values, as compared with commercial catalyst employing zeolites containing Na of like Na content.

EXAMPLE 4

An attempt to improve results by further reducing the Na content by an intermediate calcination after an initial exchange with aluminum ion followed by a further exchange with aluminum ion did not materially improve the M value of a catalyst formulated from such a zeolite.

A zeolite exchanged as in Example 2 was washed and calcined in air for three hours at 1000° F. and re-exchanged by the procedure of Example 3. The zeolite analyzed as follows:

| | |
|---|---|
| $Na_2O$ | 0.87 |
| $Al_2O_3$ | 28.6 |
| $SiO_2$ | 68.9 |

The zeolite was formulated into a catalyst as in Example 1 and tested with the following results:
M=37%
S+=33%

The following example illustrates the effect of further reducing the Na content by exchange with NH₄+ after prior exchange with aluminum ion.

EXAMPLE 5

The NaY zeolite of Example 1 was exchanged three times with Al(NO₃)₃ as in Example 2. The washed exchanged zeolite analyzed as follows:

| | |
|---|---|
| $Na_2O$ | 3.8% |
| $Al_2O_3$ | 30.8% |
| $SiO_2$ | 63.8% |

The washed exchanged zeolite was exchanged with ammonium nitrate as in Example 1, filtered and washed.

The aluminum ammonium zeolite analyzed as follows:

| | |
|---|---|
| $Na_2O$ | 3.52% |
| $Al_2O_3$ | 32.8% |
| $SiO_2$ | 63.1% |
| $NH_3$ | 1.0% |

The zeolite was formulated into a catalyst according to the procedure of Example 1. The activity was determined as follows:
M=72.7%
S+=34%

EXAMPLE 6

A second sample of NaY was exchanged as in Example 5.

The aluminum sodium Y analyzed as follows:

| | |
|---|---|
| $Na_2O$ | 4.15% |
| $Al_2O_3$ | 31.1% |
| $SiO_2$ | 64% |

The exchanged zeolite was again exchanged with NH₄+ as in Example 5.

The ammonium, aluminum, sodium Y analyzed:

| | |
|---|---|
| $Na_2O$ | 3.2% |
| $Al_2O_3$ | 29.7% |
| $SiO_2$ | 67.3% |
| $NH_4$ | 2.8% |

This zeolite was formulated into a zeolite according to the procedure of Example 1 and had the following activity:
M=73.1%
S+=33.1%

The requirements of exchange and the stability of the zeolite in the exchange process where the exchange of the Y zeolite is not preceded by an ammonium exchange is illustrated by the fact that the peak 2θ positions and the peak intensities of the zeolite are substantially unaffected. X-ray scans produced under the same conditions as the zeolite of Example 6 when compared with the X-ray scan of the NaY of Example 1 show 2θ values at the same angle ± above 0.05° and the ratios of the height of lines at similar angles are on the average unity.

The following table shows the synergistic effect of the ammonium ion on the activity of the catalyst if the exchange with ammonium is on the aluminum sodium Y rather than on the sodium Y.

|       | % Na$_2$O | M % | S + % |
|-------|-----------|-----|-------|
| Ex. 1 | 3.91      | 36  | 32.8  |
| Ex. 2 | 3.96      | 44  | 31    |
| Ex. 3 | 1.44      | 46  | 37.3  |
| Ex. 4 | 0.87      | 37  | 33    |
| Ex. 5 | 3.8       | 72  | 34    |
| Ex. 6 | 3.2       | 73  | 33    |

As will be seen from the above, the reduction of the sodium in the zeolite Y by aluminum ion either directly as in Examples 2, 3, and 4 or by first exchange with NH$_4$ followed by aluminum results in inferior M activity in the region under 50%. The reduction of the sodium ion to similar or even higher residual Na$_2$O content when the Al exchange precedes an NH$_4$ exchange, gives M values of 70% conversion.

The replacement of the ammonium ion by polyvalent cations which have been found in the prior art to be useful in producing catalysts of good activity values have had little effect on the M or S+ activity of the aluminum exchanged zeolites.

EXAMPLE 7

The partially aluminum exchanged zeolite of Example 5 was exchanged with polyvalent metallic cations instead of the NH$_4$+ using similar ratios of equivalents of the metal cation per equivalent of Na in the Na Y zeolite, as the said ratio employed for the ammonium exchange in Example 6.

The following salts were employed.

| Sample 1 | lanthanum nitrate La(NO$_3$)$_3$ at pH 3.5 adjusting the pH by addition of the corresponding acid. |
|----------|---------------------------------------------------------------------------------------|
| Sample 2 | calcium nitrate Ca(NO$_3$)$_2$ at pH 3.5 adjusting the pH by addition of the corresponding acid. |
| Sample 3 | copper chloride CuCl$_2$ at 3.5 adjusting the pH by addition of the corresponding acid. |
| Sample 4 | ferric ammonium citrate Fe(NH$_4$)$_3$(C$_3$H$_5$O$_7$) at pH of 5 adjusting with citric acid. |

The lanthanum salt is representative of the rare earth salt. The calcium salt is representative of the alkaline earth salts and the copper and iron salts are representative of the salts of the metals of atomic number 24 through 29. The exchanged zeolite was filtered, washed and formulated into a catalyst as in Example 1.

The various exchanged samples had the following activiities analyses:

| Sample    | 1     | 2     | 3    | 4     |
|-----------|-------|-------|------|-------|
| Na$_2$O   | 3.66% | 3.27% | 3.5% | 4.13% |
| La$_2$O$_3$ | 4.01 |       |      |       |
| CaO       |       | 1.0   |      |       |
| CuO       |       |       | 1.4  |       |
| Fe$_2$O$_3$ |     |       |      | 0.68  |
| Al$_2$O$_3$ | 29.9 | 32.0  | 31.2 | 27.7  |
| SiO$_2$   | 62.2  | 28.3  | 62   | 66.4  |
| M %       | 59.7  | 38.5  | 38.7 | 64.6  |
| S + %     | 29.5  | 26.5  | 34.1 | 33.9  |

In all cases, the NH$_4$ cation following an aluminum exchange gave superior M values. The M value for iron ion exchange is surprising, particularly in that the cracking test showed that the catalyst compared with the aluminum-ammonium exchange catalyst of Example 6.

The catalyst produced by incorporating the faujasite zeolite preferably the Y zeolite exchanged according to our invention into a matrix using aluminum as the trivalent cation, makes it possible to replace the more expensive rare earth cations used conventionally in prior art catalyst. Many sources of rare earth salts are radioactive and the substitution of Al not only avoids this hazard but substantially reduces the cost since aluminum salts are much cheaper than rare earth salts.

We therefore propose to formulate the catalyst of our invention by exchanging a faujasite zeolite containing Na in exchange position, preferably a Y zeolite with an aluminum salt at a pH which will hold the aluminum ion in solution, that is a pH of under 4 but a pH which will not attack the zeolite, i.e., at a pH in the range of about 3 to 4. The exchange carried out preferably, for example, in excess of 50% of the original sodium in the zeolite. The Na content of the aluminum zeolite is preferably reduced to less than 6% expressed as Na$_2$O on a volatile free basis. The so exchanged zeolite is then exchanged with a different cation salt under conditions which will not attack the zeolite for example at a pH above about 3 or higher but sufficient to hold the second cation in solution. We may use the alkaline earth salts, rare earth salts, or the salts of the metals of atomic number 24 through 29.

We prefer to employ the NH$_4$ ion, although the ferric ion appears to be suitable, especially when used as a salt which is not too acid in the reaction, to reduce the sodium content of the exchanged zeolite (expressed as Na$_2$O) on a volatile free basis to less than 5%.

The resultant zeolite when well washed may be incorporated into a matrix such as has been used in the prior art.

The catalyst preferably is formed by mixing about 15% to 20% of the exchanged zeolite with 10 to 30 parts by weight of the pseudoboehmite expressed as Na$_2$O and 40-80 parts by weight of clay, all on a volatile free basis. The components are described in U.S. Pat. No. 4,010,116. Other matrixes, such as suggested in the prior art for faufasite catalysts, may be used. The slurry is spray dried to form microspheres. Where the zeolite has been exchanged with NH$_4$+, the heating during spray drying may cause the removal of NH$_3$ resulting in a partial or substantially complete conversion of the NH$_4$ ion in exchange position to proton (H+) or some decationization.

We may also cause an exchange of the residual Na present after the initial Al exchange with two or more of the above cations either simultaneously or by a series of exchanges.

We claim:

1. The aluminum exchanged zeolite of the faujasite type which is produced by treating a sodium zeolite of the faujasite type with an aluminum salt solution to form a zeolite containing Na in exchange position in amount less than about 6% expressed as Na$_2$O on a volatile free basis and then further exchanging the said treated zeolite with a salt of a monovalent or polyvalent cation other than aluminum and further reducing the sodium cation in the exchanged zeolite.

2. The zeolite of claim 1 in which the cations are chosen from the group consisting of the alkaline earth cations, rare earth cations and a metallic cation of atomic number 24 through 29.

3. The process of forming an aluminum exchanged zeolite of the faujasite type which comprises treating a sodium zeolite of the faujasite type with an aluminum salt solution to form a zeolite containing Na in exchange position in amount less than about 6% expressed as $Na_2O$ on a volatile free basis and then further exchanging the said last named zeolite with a salt of a monovalent or polyvalent cation other than aluminum and further reducing the sodium content of the zeolite by said further exchange.

4. The process of claim 3 in which the cations are chosen from the group consisting of the alkaline earth cations, rare earth cations and a metallic cation of atomic number 24 through 29.

5. A catalyst comprising a matrix and an aluminum exchanged zeolite of the faujasite type which is produced by treating a sodium zeolite of the faujasite type with an aluminum salt solution to form a zeolite containing Na in exchange position in amount less than about 6% expressed as $Na_2O$ on a volatile free basis and then further exchanging the said last name zeolite with a salt of a monovalent or polyvalent cation other than aluminum and further reducing the sodium content in said by said further exchange.

6. The catalyst of claim 5 in which the cations are chosen from the group consisting of the alkaline earth cations, rare earth cations and a metallic cation of atomic number 24 through 29.

7. A process for forming a catalyst which comprises mixing in a water slurry a matrix and an aluminum exchanged zeolite of the faujasite type which is produced by treating a sodium zeolite of the faujasite type with an aluminum salt solution to form a zeolite containing Na in exchange position in amount less than about 6% expressed as $Na_2O$ on a volatile free basis and then further exchanging the said last named zeolite with a salt of a monovalent or polyvalent cation other than aluminum and further reducing the sodium content in said zeolite by said further exchange and spray drying said slurry.

8. The process of claim 7 in which the cations are chosen from the group consisting of the alkaline earth cations, rare earth cations and a metallic cation of atomic number 24 through 29.

9. The aluminum exchanged zeolite of the faujasite type which is produced by treating a sodium zeolite of the faujasite type with an aluminum salt solution to form a zeolite containing Na in exchange position in about less than about 6% expressed as $Na_2O$ on a volatile free basis and thereafter further exchanging the said treated zeolite with a salt of ammonium and further reducing the sodium content in said zeolite.

10. The process of forming an aluminum exchanged zeolite of the faujasite type which comprises treating a sodium zeolite with an aluminum salt solution to form a zeolite of the faujasite type containing Na in exchange position in amount less than about 6% expresses as $Na_2O$ on a volatile free basis and further exchanging the said last name zeolite with a salt of ammonium and further reducing the sodium content in said zeolite.

11. A catalyst comprising a matrix and an aluminum exchanged zeolite of the faujasite type which is produced by treating a sodium zeolite of the faujasite type with an aluminum salt solution to form a zeolite containing Na in exchange position in amount less than about 6% expresses as $Na_2O$ on a volatile free basis and further exchanging the said last name zeolite with a salt of ammonium and further reducing the sodium content in said zeolite.

12. A process for forming a catalyst which comprises treating a sodium zeolite of the faujasite type with an aluminum salt solution to form a zeolite containing Na in exchange position in amount less than about 6% expressed as $Na_2O$ on a volatile free basis and further exchanging the said last named zeolite with a salt of ammonium and further reducing the sodium content in said zeolite, and mixing said further exchanged zeolite with a matrix.

13. The product of claims 1, 2, 5, 6, 9, or 11 in which the sodium content of the further exchanged zeolite is less than about 5% expressed as $Na_2O$.

14. The process of claims 3, 4, 7, 8, 10, or 12 in which the sodium content of said zeolite is reduced by said further exchange to less than about 5% expressed as $Na_2O$.

* * * * *